(No Model.)
C. E. McCLUER.
ARTIFICIAL GROUND AND COMPOUND METALLIC CIRCUIT SYSTEM.
No. 437,311. Patented Sept. 30, 1890.
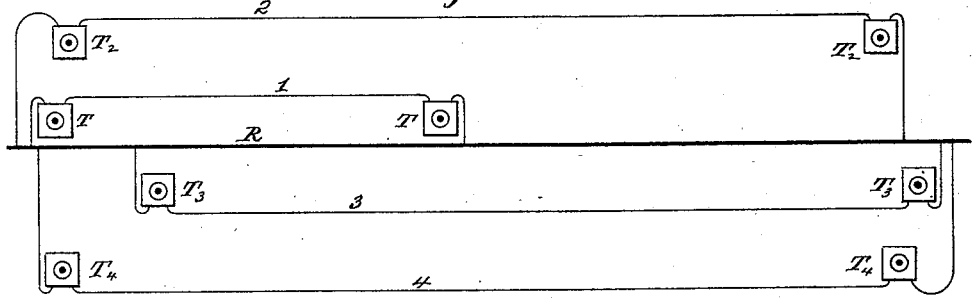
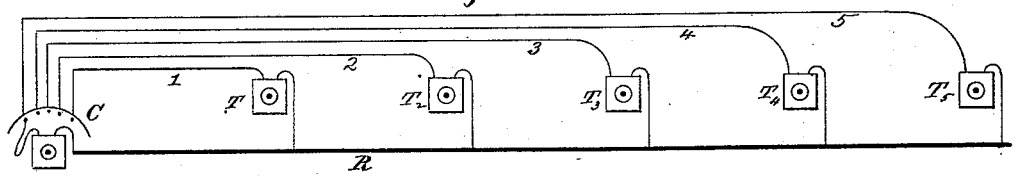
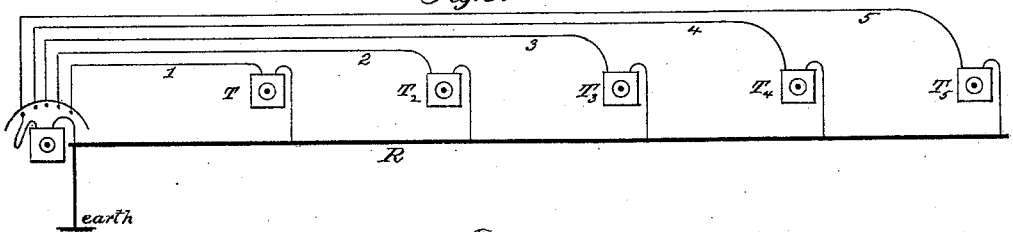
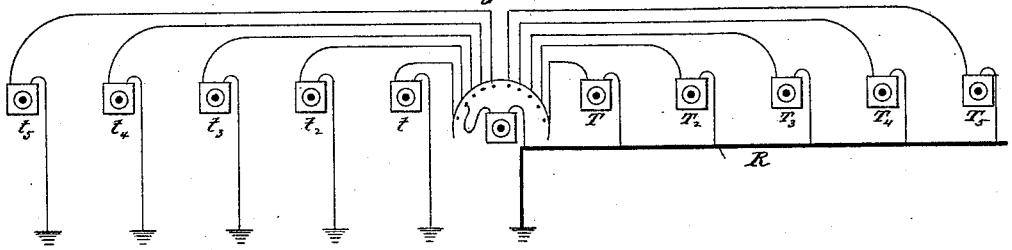
Witnesses:
C. E. McCluer, Inventor.
McTighe & Worthington, Attorneys.

UNITED STATES PATENT OFFICE.

CHARLES EDWARD McCLUER, OF RICHMOND, VIRGINIA.

ARTIFICIAL GROUND AND COMPOUND METALLIC CIRCUIT SYSTEM.

SPECIFICATION forming part of Letters Patent No. 437,311, dated September 30, 1890.

Application filed June 1, 1888. Serial No. 275,763. (No model.)

*To all whom it may concern:*

Be it known that I, CHARLES EDWARD MC-CLUER, a citizen of the United States, residing at Richmond, in the county of Henrico, State of Virginia, have invented an Artificial Ground and Compound Metallic Circuit System, of which the following is a full, clear, and exact description, reference being had to the accompanying drawings, forming a part of this specification.

The object of my invention is to avoid interference electrically between the several lines of a single telephone, telegraph, or other multiple-line system, and also interference by leakage from other and especially high-potential lines.

It being well known that a current of electricity flowing over a conductor will generate in an adjacent conductor an induced or secondary current, it was very natural that during the early history of the telephone the adverse influences of all extraneous or foreign currents upon that extremely sensitive electrical instrument should have been included in the general term "induction." Observation and experiment have, however, demonstrated the fallacy of this theory and proved that the chief cause of telephonic disturbances is leakage or conduction, not induction. Through what distance induction occurs depends mainly upon the character of the primary or inducing current; but even when the wires of telephone and electric-lighting and power systems are arranged for considerable distances in close proximity the currents induced upon the telephone-wires by the dynamo-currents are less disastrous to the telephone service than the currents which leak over or are conducted from the one system to the other.

When it is considered that there is no perfect electrical insulator or conductor known, and that substances classed as such differ only in degree, a good conductor merely transmitting electrical impulses readily while a good insulator propagates them with difficulty, it can be conceived that an electrical current of high-potential or electro-motive force may spread over or through the very best insulators and become diffused through any conductor or system of conductors that may conveniently offer in strict conformity to the laws governing the transmission of electricity. Until recently electricians have concurred in the belief that the earth is an infinite conductor of electricity, and that it offers no resistance whatever to the propagation of electrical impulses. In view of recent observations and experiments, however, the correctness of this theory is questioned, and the earth is held to be merely an extraordinarily good conductor because of its immense mass, but really offering an appreciable resistance to the transmission of electrical force.

Accepting, then, these two facts, that the very best "insulators" will, under proper conditions, become "conductors," and that the best known conductor, the "earth," does offer an appreciable resistance to the transmission of electricity, it follows that electrical currents of high potential may leak or be conducted over the best glass or other insulating substances, and reaching the earth may there meet with such resistance as to compel them to traverse any convenient conductors, in exact proportion to their respective conductivities, in obedience to Ohm's well-known law.

Thus far I have been dealing with the prior state of the art, upon which my invention is designed to be grafted; but now I will call attention to other conditions which necessitated the improvement which this application proposes to cover and embrace. Even when a common metallic return has been employed, it has been found that as constructed heretofore such return-conductor did not prevent the current leaking, as heretofore described, from adjoining or proximate more powerful circuits to such return-conductor, and then distributing its electrical force between the several lines of the multiple circuit to which such return-conductor was connected. In other words, the leakage current would, instead of being carried entirely off by the return-conductor, be divided between such return-conductor and the various lines or branches connected therewith in exact proportion to the several resistances of the return-conductor and its connecting lines or branches. Now, by a long course of experiments, I have found that if such return-conductor is materially less in resistance or greater in conductivity than the lines or branches in the circuit to which it is connected the proportion of leakage current which will flow over such lines or branches will be so small as not to practically interfere with their working. I have also found that with such a return-conductor the telephone-currents which are from time to time generated and pass over the several subscribers' lines will not practically interfere with each other, but will all pass or be conducted away from such lines by the common return or less resistance employed in connection with said lines. The main principle of my invention, therefore, consists in constructing a common return-conductor of such small resistance and comparatively great conductivity that it will absorb substantially the whole of the telephone-current which has passed over any one or more of the subscribers' lines and also the leakage from extraneous high-potential lines, and thus all disturbance or injurious effects resulting from interference between the several currents will be avoided. The application of this main principle is manifestly capable of wide variation, and some of these variations are hereinafter described and constitute subsidiary features of my invention.

It is not of much practical importance what location upon the supports of aerial systems or in the conduits of underground systems shall be allotted to the "artificial ground" conductors, or what their position shall be relatively to the direct wires of the system, provided they follow the same routes traversed by the direct wires; but I prefer to place them beneath the aerial wires, as near to the earth and as far from the direct wires as may be convenient, and in the center of the underground cables as far as may be practicable.

Having thus endeavored to explain the object and nature of my invention, I will now proceed to describe it in connection with the accompanying diagrams.

Figure 1 represents my invention applied to a number of single electric wires following the same route; Fig. 2, as applied to an entire exchange system; Fig. 3, as applied to one section of an exchange only, with the artificial ground connected to the earth at the central office; while Fig. 4 is intended to illustrate the manner in which circuits are completed between stations connected to the artificial ground and those which are still connected to the earth.

Recurring to Fig. 1, a copper wire or other wire of relatively large conductivity is represented by the heavy line R, connecting the various telephone or telegraph stations indicated in order to avoid complication by the simple main-line connections of the telephone-transmitters T T 2, T 3, and T 4. This wire R of large conductivity, forming, as it does, a common return-wire for all the direct wires, is used in identically the same manner as the earth in "mixed" circuits, being in reality an artificial substitute for the earth. Hence the term "artificial ground."

Supposing the direct wires 1, 2, 3, and 4 to be constructed of No. 14 steel wire the resistance of which is seventy-five ohms per mile, the artificial ground wire R should be of Nos. 10 or 12 copper wire or other similar conductor, offering between the two points at which the terminals of any single line are connected to it approximately one-tenth, or, better still, one-twentieth, the resistance of the direct wire between the same points. Thus, if the direct wire No. 1, with its normally-included instruments T and T, should measure one hundred ohms, the artificial ground should measure only ten ohms, or, better still, only five ohms, between the points at which line No. 1 is connected to it. In like manner did line 2 and its included electrical apparatus T 2 T 2 measure one thousand ohms between the points at which the terminals are connected to the artificial ground R, then the latter should measure one hundred ohms, or, still better, only fifty ohms, between the same points. Under these conditions the electrical undulations produced upon the direct wires by the vibrations of the transmitter-diaphragms will be almost wholly confined to their own circuit, the high conductivity of the artificial ground R preventing any appreciable leakage from one circuit to the other. This would more certainly be the case at the very time when such leakage would be the most objectionable—that is, while two parties are engaged in a telephonic conversation, the resistance of the hand-phone and transmitter-coils being then in circuit and offering a largely-increased resistance to the passage of extraneous or leakage currents from the other wires. Thus, were two parties engaged in conversation from stations T and T of line 1 at the same time that other parties were talking from $T^2$ and $T^2$ over line 2, there would be no serious or objectionable interference as long as the resistance of the artificial ground R bears the proper proportion to the resistance of the direct wires 1 and 2; but the currents in motion upon each direct wire will be almost wholly confined to their own wire and that portion of the artificial ground-wire extending between the two stations. In like manner all four wires may be in use simultaneously without any serious mutual interference, or one station may "ring up" the other station on the same wire without interfering with the conversations on the other wires of the system, the currents from the magneto-generator or the galvanic battery, like those set in motion by the microphone or transmitter batteries, preferring to confine themselves to their own direct wire and the low-resistance artificial ground rather than encounter the much larger resistance offered by the other direct wires and their telephones or other included electrical apparatus. It will thus be clearly seen that by the substitution of a single return-wire in place of the earth all connection with the earth is severed to the perfect exclusion of earth-currents, atmospheric electricity, and leakage from contiguous telegraph, or electric light, and power systems; hence the term "compound metallic circuit."

In Fig. 2 we have represented five stations of a telephone or other electrical exchange system entirely disconnected from the earth and connected to the artificial ground R instead. By means of the usual switching appliances of the general office C any two of the direct wires 1, 2, 3, 4, or 5 can be connected together in complete metallic circuit, or the central-office telephones or other electrical apparatus can be connected to either of the five lines, as they are in the figure represented as being connected to line 5. While the central office is thus engaged in conversation with the most distant station $T^5$, over a circuit consisting of the direct wire 5 on one side and the entire length of the artificial ground on the other, any two of the remaining stations may be placed in communication with each other by the central-office terminals being connected together in the usual manner. If T and $T^2$ are thus connected, the circuit would consist of the two direct wires 1 and 2 and included devices, and that portion of the artificial ground between the points at which the ground side of the two station-instruments T and $T^2$ are connected to it. Thus any number of exchange-stations may be connected to and served by an artificial ground wire as a substitute for the earth, it only being essential that the resistance of that portion of the artificial ground R included in the circuit should bear relatively to the resistance of the two direct wires approximately the proportions mentioned above.

It is frequently the case that serious interference with a telephone-exchange service by extraneous or leaking currents is experienced only in certain localities or on certain routes, while other sections of the exchange or other routes are comparatively exempt from such disturbances, these conditions depending largely upon the extent and character of the electrical system from which the disturbance comes and the character of the earth to which the telephone-lines are immediately connected. In such cases it is unnecessary to incur the expense of applying the artificial ground to the entire system, its application to the routes and wires adversely affected serving every purpose; but it is manifestly impracticable to satisfactorily operate purely "metallic" circuits in direct connection with "grounded" circuits. Hence the modification shown in Fig. 3 is necessary.

As before, R represents the artificial ground with the five lines and stations connected to it precisely as represented in Fig. 2, but with the artificial ground connected to the natural earth at the central office. Any of the stations on the artificial ground system can be connected to the central office or to each other, and all the talking and calling currents will traverse the metallic circuits only, as in Fig. 2; but some slight disturbance from extraneous currents from the earth will still be experienced by reason of their following the ground-wire from the earth to the artificial ground, and thence over the subscribers' wires and to the earth again over the insulators and down the poles; but even this arrangement of the artificial ground connected to the earth at the central office, or any other convenient locality, will eliminate seventy-five or eighty per cent. of the troubles arising from the leakage on grounded circuits.

Fig. 4 is designed to show the necessity of grounding the artificial ground at the central office or elsewhere, as described above in connection with Fig. 3, as long as any of the subscribers' wires in the exchange system remain connected to the natural earth. It will readily be seen that no "circuit" would exist between grounded station $t^5$ and compound metallic circuit $T^5$ were not the artificial ground connected to the earth at some point; but connected to the earth as represented the return-circuit is completed from $T^5$ through the artificial ground to the earth at the central office and through the earth to the direct wire and station $t^5$, and so with any other stations.

As soon as the artificial ground is applied to the entire exchange and all stations are disconnected entirely from the earth, there is no longer any necessity for maintaining the artificial ground in connection with the earth at the central office or elsewhere, and the moment this—the last earth connection—is removed the entire system is converted into a compound metallic circuit system and entirely relieved from all interference or leakage from the earth.

It is not claimed that the use of an artificial ground wire offering even one-twentieth of the resistance of the direct wire will entirely prevent conduction or leakage from one circuit to another. That is forbidden by the terms of Ohm's law, which correctly states that a current of electricity from any source or of any electro-motive force will divide among any number of paths offered it precisely in inverse proportion to their individual resistances; but I do claim that the currents leaking over from one circuit to another in my "artificial ground and compound metallic circuit" system, if constructed in accordance with the foregoing specification, will be so small as not to interfere to any appreciable or serious extent with the satisfactory working of the telephones. But the more nearly the conductivity of the artificial ground approximates the conductivity of mother earth the better will be the result. When it is inconvenient or impracticable to reduce the resistance of the artificial ground to the requisite degree, increasing the resistance of the direct wire will accomplish the same result; but the conductivity of the artificial ground can readily be increased to any necessary extent by stringing additional wires beside them and connecting or "bunching" them together.

While the drawings and foregoing specification may seem to refer especially to aerial lines and single wires, my device is equally applicable to cable systems, either aerial or underground. The cables containing the conductors for the subscribers' or direct wires may be constructed each with a central core composed of a large copper wire possessing the requisite conductivity to serve the purpose of an artificial ground, or a special wire for aerial cable systems, or a special insulated wire or cable for underground cable systems can be utilized with just as satisfactory results, provided all the conditions as to conductivity and insulation as described above are present. In like manner, while I have illustrated and described my invention mainly in connection with telephone lines and systems, it is equally applicable to any known telegraph or electrical system which it is found necessary or desirable to disconnect from the earth and operate on metallic circuits.

It is well known to me that even the ordinary metallic circuit, consisting of two separate and distinct wires, is no protection from "induction" proper, and I do not claim that my device will eliminate the evils of induction; but I do contend that it does eliminate the evils of conduction or leakage, which are the greatest enemies of telephone or other sensitive electrical systems, and allows the electrician a better opportunity to introduce the well-known "anti-induction" cables and the "transposition" of direct wires in order to still further improve the operation of the instruments by neutralizing or eliminating induction; but my invention is not to be confounded with any of these anti-induction devices, having an entirely different and much more important mission in protecting telephone and other electrical systems from the more serious evils of conduction and leakage.

I wish it to be understood that I do not broadly claim a system comprising a number of lines or branches having a common metallic return, for I am well aware that this is old, and I only desire to cover the improvement engrafted by me upon such a system.

I therefore claim as my invention, for which I pray that Letters Patent may be granted me—

1. In combination with a system of ordinary electrical conductors, such as telephone or telegraph wires and including electrical apparatus, of one or more conductors insulated from the earth and connected to the terminals of the first-named conductors, and of such low resistance or high conductivity as to offer only a fractional portion of the resistance offered by the wires first mentioned to the passage of a current, substantially as and for the purpose set forth.

2. In combination with a system of line-wires including translating devices, of a common return-conductor insulated from the earth and connected to the terminals of the line-wires and of such low resistance or high conductivity as to offer only a fractional portion of the resistance offered by the wires first mentioned to the passage of a current, substantially as and for the purpose set forth.

3. In a telephone-exchange, a system of line-wires radiating from the central-office switch-board to the subscribers' stations and including the usual telephones and appliances, in combination with a series of common metallic returns insulated from the earth and having the several wire returns of such low resistance as to offer only a fractional portion of the resistance offered by any one of the line-wires first mentioned, substantially as and for the purpose set forth.

4. In a telephone or other exchange system, the combination of a number of subscribers' lines radiating from the central-office switch-board and including the necessary working apparatus, with electrical conductors of such low resistance as to constitute only a fractional portion of the resistance of any one of the subscribers' lines before mentioned, and to which electrical conductors the subscribers' lines are connected at their distant ends and which are insulated from the earth at all points save one, where they are connected to a ground-switch, whereby the system can be converted into a compound metallic circuit system by breaking the connection with the earth, or can be worked in connection with the earth in a system of ordinary mixed circuits at will, substantially as and for the purpose set forth.

In testimony whereof I affix my signature in presence of two witnesses.

CHARLES EDWARD McCLUER.

Witnesses:
E. HARVEY SYMONDS,
S. W. TAURMAN.